United States Patent [19]
Dupont

[11] Patent Number: 4,842,520
[45] Date of Patent: Jun. 27, 1989

[54] ANALOGUE SIMULATOR FOR CONTROL CIRCUITS, ACTUATED FROM OPERATING STATION OR COCKPIT

[76] Inventor: Daniel Dupont, 12, Sente de la Loge à Vallée, 77100 Neufmontiers, France

[21] Appl. No.: 936,342
[22] PCT Filed: Mar. 20, 1986
[86] PCT No.: PCT/FR86/00096
§ 371 Date: Nov. 7, 1986
§ 102(e) Date: Nov. 7, 1986
[87] PCT Pub. No.: WO86/05614
PCT Pub. Date: Sep. 25, 1986

[30] Foreign Application Priority Data
Mar. 21, 1985 [FR] France ................. 85 04195

[51] Int. Cl.$^4$ .............. G09B 9/08; G09B 250/00; G06G 7/62; G08B 5/36
[52] U.S. Cl. ........................... 434/30; 434/49; 434/372; 434/379; 364/802; 364/805; 340/815.12
[58] Field of Search ............ 434/30, 32, 49, 53, 434/224, 368, 372, 379, 380, 429, 430; 364/801–803, 805; 340/815.03, 815.06, 815.12, 792, 800

[56] References Cited
U.S. PATENT DOCUMENTS

| | | | |
|---|---|---|---|
| 3,573,792 | 4/1971 | Reed | 340/815.12 |
| 3,754,244 | 8/1973 | Garrett | 340/815.12 |
| 3,914,795 | 10/1975 | Alliston et al. | 434/218 |
| 4,365,245 | 12/1982 | Colmenero | 340/792 |
| 4,463,605 | 8/1984 | McDowell et al. | 434/31 |

*Primary Examiner*—Theodore M. Blum
*Assistant Examiner*—Gregory C. Issing
*Attorney, Agent, or Firm*—Blakely, Sokoloff, Taylor & Zafman

[57] ABSTRACT

The simulator is used for the training of personnel. In the case of the controls of an aircraft, the simulator contains an exact reproduction of the command cockpit (1) with all its controls (2), and capable of ensuring the actuation of circuit simulation devices by a student-operator (3). Simulation devices (4) consist of at least one instruction panel ($5_1$, $5_2$) representing at least one control circuit and used to display various parameters or simulation motifs visible to the student-operator. An operating console (6) ensures contact between the simulation devices (4) and the cockpit (1). The console makes it possible to carry out a training programme administered by an instructor-operator.

7 Claims, 4 Drawing Sheets

FIG_1

FIG_2a

FIG_2b

FIG_3

FIG_4a

FIG_4b

FIG_4c

FIG_5

ANALOGUE SIMULATOR FOR CONTROL CIRCUITS, ACTUATED FROM OPERATING STATION OR COCKPIT

The present invention relates to an analogue simulator for control circuits actuated from an operating station or cockpit. It particularly concerns, although in a nonlimitative manner, an analogue simulator of the control circuits of an aircraft more especially adapted for training on new equipment.

This type of simulation apparatus, particularly in the case of aircraft, is known under the name "cockpit trainer". In a general manner, there are no dynamic sequences reproducing the condition of flight, the use of this type of apparatus being above all for the new qualification of the envisaged users or for revision courses relating to aircraft circuits.

Analogue simulators for circuits are already known as such. In particular, an analogue simulator for fluid circuits has been described in French Certificate of Utility No. 2 491 238. This type of simulator principally intended to ensure the representation of different parameters of operation of an installation of ventilation networks for subterranean mine galleries cannot however permit an interactive type of use between the student operator and the instructor operator both able to act on the simulation parameters of the simulator.

The invention has the object of providing a simulator device permitting a use of the type stimulus, response, control between an instructor operator and a student operator. It relates to an analogue simulator for control circuits actuated from an operating station or control cockpit such as an aircraft cockpit. The simulator comprises an exact reproduction of the control cockpit able to ensure the functioning by a student operator of simulation devices of the control circuits. The simulation devices are constituted in at least one instruction panel each showing at least one control circuit and intended to display different parameters or simulation motifs visible by the student operator. An operating console ensures the connection between the simulation devices and the cockpit and is able to permit a modification by an instructor operator of the simulation parameters of the simulation devices according to a procedure of priority between the orders coming from the operating console and the orders coming from all the functions of the cockpit.

The invention finds application principally in the field of aeronautics but can of course be used in any other field in which the driving of an installation is to be learned.

The invention will be better understood from reading the description and studying the drawings below in which.

Figure 1:
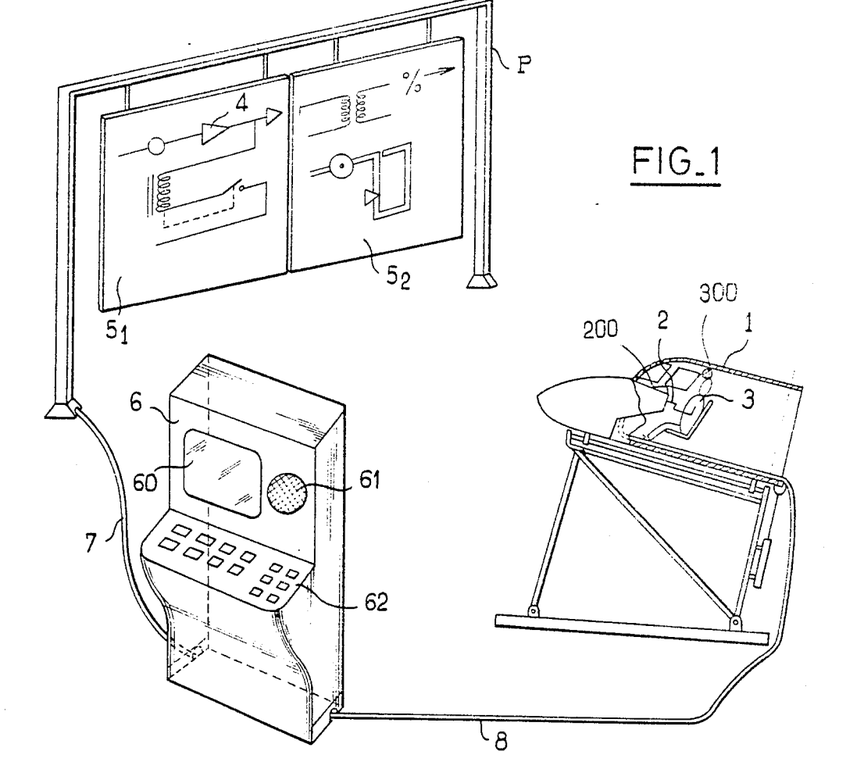
FIG. 1 shows a general layout of an analogue simulator according to the invention.

As shown in FIG. 1, the analogue simulator for control circuits actuated from an operating station or cockpit comprises an exact reproduction of the control cockpit 1 provided with controls capable of ensuring the actuation of simulation devices of the circuits by a student operator 3.

In FIG. 1, the control cockpit 1 is represented by an aircraft cockpit in a broken view. The control cockpit is an exact reproduction of a fully functional aircraft cockpit including all buttons, systems, control means and the like which are being simulated. Each button or control means permits the student operator 3 to actuate the lighting or extinction of the simulation devices representative of the control circuits of the aircraft.

The simulation devices 4 are constituted by at least one instruction panel, reference $5_1, 5_2$ in FIG. 1, each representing at least one control circuit of an installation or of the aircraft. The panel or panels are intended to display different parameters or simulation motifs visible by the student operator 3. For this, the instruction panel or panels $5_1, 5_2$ are for example suspended from a frame designated P and positioned a good distance from the cockpit 1 and the student operator 3, in order to permit the latter to have a good visibility of the whole as well as a good perception of the details of the display of the different parameters or simulation motifs.

As also appears in FIG. 1, the analogue simulator of the invention comprises an operating console 6 ensuring the connection between the simulation devices 4 and the cockpit 1. In FIG. 1, the mentioned connection has been shown by means of multi-core cables able to ensure the transmission of any necessary information or dialogue between the student operator 3 and the simulation devices, principally the instruction panels $5_1, 5_2$ as well as with an instructor operator whose role is, from the operating console 6, to ensure the complete running of a training programme for the student operator 3. Thus, the operating console 6 is able to permit a modification by the instructor operator of the simulation parameters of the simulation devices 4 according to a procedure of priority between the orders coming from the operating console 6 and the orders coming from the controls of the cockpit 1. The operating console can be placed outside or even inside the cockpit 1.

In order to provide all the mentioned functions, each control of the exact reproduction 2 of the cockpit 1 permits the control of lighting or extinction of corresponding simulation devices 4. In order to ensure suitable likeness of the simulation with the operational conditions of the actual controls, a part of the aircraft's instruments' function, for example the motors, and the different illuminations are also reproduced.

With a view to permitting a modification of the simulation parameters of the simulation devices 4 according to a priority procedure between the orders coming from the operating console 6 and the orders coming from the controls of the cockpit 1, the operating console 6 is managed by a microprocessor provided with its peripheral circuits. The microprocessor can be constituted for example by any normally available 16 bit microprocessor because of the large address capacity of these latter. The microprocessor is driven by an interactive program of the "menu" type able to permit the instructor operator to define the previously mentioned priorities with a view to defining a selective programmed variation of the simulation parameters presented to the student operator 3.

As appears in FIG. 1, the operating console 6 can in a preferred manner be provided with an electro-acoustic transducer 61 able to ensure an audio frequency connection with the cockpit 1 and thus between the instructor operator and the student operator, a television-type monitor 60 on which are particularly displayed the excitations produced by the "menu" program for the choice of simulation parameters and of the training program, a keyboard 62 comprising an assembly of alpha-numeric keys and of programmable function keys, which are able to be programmed by the instructor operator himself.

The operating console 6 can be provided with functions called specific functions. All these functions can advantageously be introduced from a program loaded in support memories of conventional type, such as for example magnetic discs.

Figure 2A:
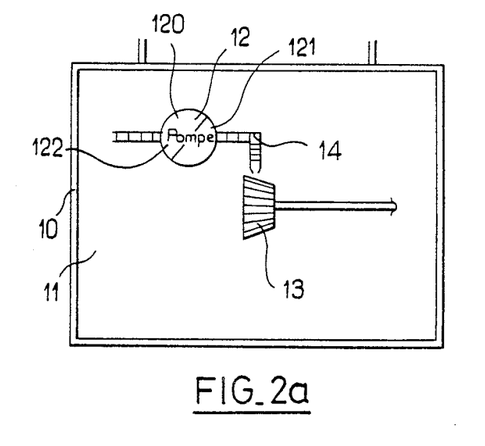
FIGS. 2a and 2b show details of the analogue simulator of the invention.

As will now be described with reference to FIGS. 2a and 2b, the simulation devices comprise at least one panel $5_1, 5_2$ for the electric circuit, for the hydraulic or fluid circuits, for the service circuits such as the air conditioning, the pressurisation and the heating for example. The simulation devices further comprise electronic control means for display of these panels. As shown particularly in FIG. 2a, each panel comprises a support body 10 for a sheet of transparent plastic material such as for example known under the registered trade mark "Plexiglas". The sheet of transparent plastic material 11 comprises representative motifs of the outline of circuits and/or apparatus constituting these circuits. The active elements of the circuits, that is to say those on which the student operator is able to act by means of the controls of the cockpit 1, are represented by windows 12,13 of colours which are lit on simulated bringing into operation of the active elements.

Figure 2B:
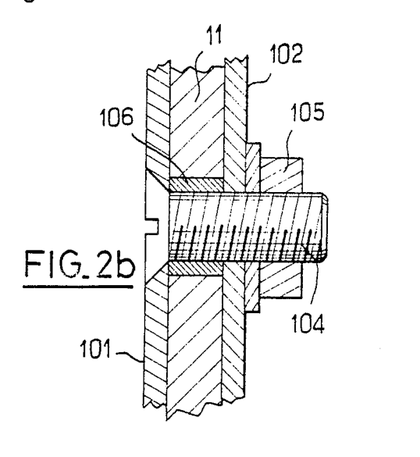

By way of non-limitative example, each panel can be constituted by a sheet of transparent material of a size suitable for being housed between two bodies 101,102 as shown in FIG. 2b and constituting the support body 10. The bodies 101,102 are assembled by means of screw systems 104, nuts 105, rubber bushes 106, the plexiglas sheet being sandwiched between the bodies 101,102. At the back of the sheet of transparent plastic material, that is to say on the surface of the panel opposite from the face intended to be presented to the student operator, a white silk-screen printing is drawn. This silk-screen printing shows the outline of circuits and/or apparatus constituting this circuit. This silk-screen printing is then covered by black paint permitting the general layout of the circuit to stand out in front for studying. The active elements of the circuit shown by the windows have simple colours or possibly a combination of colours 120,121 coded in a manner to define the nature of active elements. The windows can further comprise legends 122 relating to the characteristics of the said active elements. These legends can relate to the nature of the active elements, the operating parameters of these active elements, limits of operational tolerance of these active elements.

In the front, that is to say on the face of the panel intended to be presented to the student operator, one finds, due to the transparence of the screen-printing, the windows of colour on which are inscribed the mentioned legends.

Figure 3:
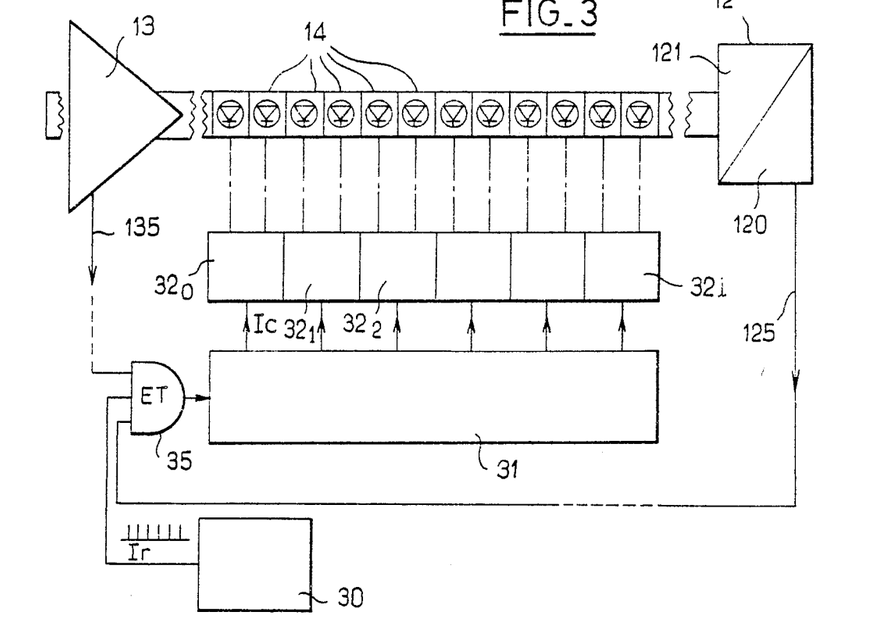
FIG. 3 shows a block diagram of electronic circuits for display of control of the analogue simulator according to the invention.

Also as will now be described with the aid of FIGS. 2a and 3, the circuits are shown on the panels by arrangements 14 of electroluminescent diodes placed edge to edge in a manner to reproduce the path of the circuits. The lighting of the diodes in operation is controlled either in a permanent manner or in an intermittent or periodic manner with electronic control means. Also as further appears in FIG. 3, these electronic control means have an adjustable frequency clock 30 able to provide reference pulses Ir of frequency in a determined range frequency. The recurrence frequency of the reference pulses Ir can be between a few Hertz and about thirty Hertz. A system of the shift register type 31 receives reference pulses Ir delivered by the clock, each shifted output stage delivering shifted, control pulses Ic to a lighting control system designated $32_o$ to $32_i$ in FIG. 3 for one or a group of electroluminescent diodes 14. The shifted, control pulses Ic delivered by the shift register 31 control in effect the lighting of the diodes 14 in steps of two successively via each lighting control system designated $32_o$ to $32_i$. A progressive lighting of the arrangement of electroluminescent diodes 14 is thus obtained showing the progression of a control order given by the student operator 3. The order given by the student operator 3 from the cockpit 1 has the effect of controlling the lighting of a window 12 or 13 for example simulating the operation of the constituent member corresponding to the circuit shown. Although not necessarily but in an advantageous manner, each window 12,13 delimiting an arrangement of diodes 14, also shown in FIG. 3, can be provided with a conditional order circuit for lighting the window, circuit 125, circuit 135 in FIG. 3. This conditional order is delivered to an AND gate 35, which also receives the reference pulses Ir from the clock. In FIG. 3, the conditional order circuits 125 and 135 for the window each have a discontinuity intended to represent the connection and the intermediary transmission by the operating console 6, and principally by the processor managing this control console, in order that a control can be effected by the management processor and then by the instructor operator. Thus, in the presence of a conditional signal for lighting of the windows, a lighting of the arrangement of diodes 14 can be carried out from clock pulses Ir in the mentioned conditions.

Figure 4A:
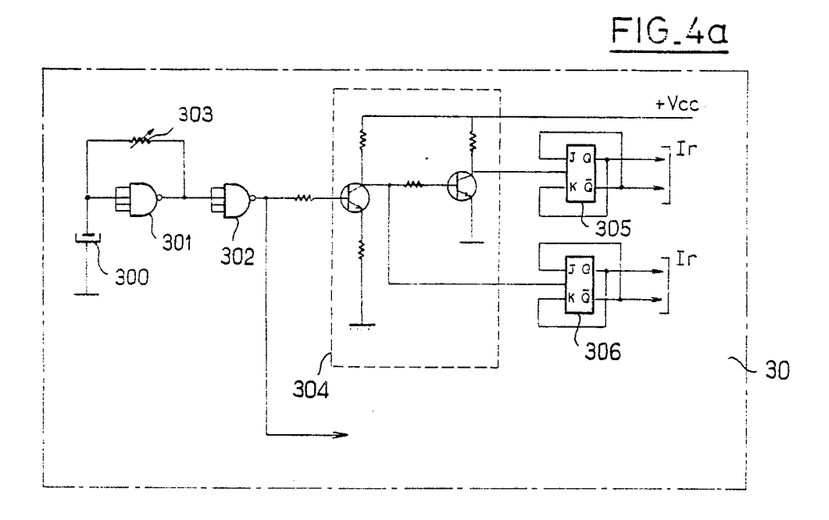
FIGS. 4a to 4c show particular preferred embodiments of different electronic circuits shown in FIG. 3.

A particular embodiment of the clock 30 and the shift register 31 will now be described by means of FIGS. 4a and 4b. According to FIG. 4a, the clock 30 comprises essentially two logic circuits 301,302 connected in cascade, the first circuit 301 having a reaction capacitor 300. An adjustable resistor 303 is connected in parallel to the input and output of the first logic circuit 301 and permits variation of the recurrent frequency of the clock pulses. The logic circuits 301 and 302 are circuits of the commercially available "trigger" type under the reference 7413 and distributed by the Texas Instruments company. The output of the second logic circuit 302 is connected to a plurality of attack circuits 304 essentially consisting of two transistors in cascade. The formation of signals to the TTL level, for example, that is to say 5 volts, is ensured by the intermediary of bi-stable trigger circuits of the type J,K referenced 305,306 and delivering the pulses Ir. It will be understood, on account of the complexity of the circuits to be simulated that this embodiment permits arranging a number of outputs sufficient for delivering the clock pulses Ir.

Figure 4B:
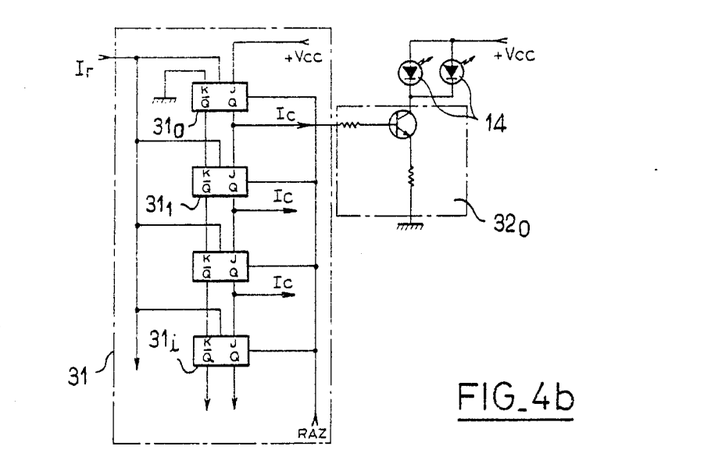

The shift register 31, as shown in FIG. 4b, can be constituted for example by a succession of bi-stable trigger circuits of the J,K type designated $31_0, 31_1, 31_i$ and connected in cascade as shown in FIG. 4b. Each output Q of the mentioned bi-stable trigger circuits delivers control pulses Ic shifted for example by a recurrence period of the reference pulses Ir. Each control pulse Ic is delivered to one of the lighting control systems $32_0$ to $32_i$ constituted by a transistor ensuring the commutation function, the collector of the transistor being for example loaded by two adjacent electroluminescent diodes 14 as shown in FIG. 4b. The shift register 31 as shown in FIG. 4b thus permits the lighting step by step of a group of diodes constituted of two mentioned diodes thus simulating the progression of the order given by the student operator on the window 13 preliminarily illuminated by this. On lighting of the last electroluminescent diode or group of diodes of the arrangement considered, the lighting of the window 12 can be triggered either directly from a conditional detection of the lighting of this last diode or group of diodes or after a delay taken for example to be equal to a period of the clock reference pulses Ir. The orders for lighting of the windows 13,12, taking account of the lighting of the arrangement(s) of the diodes 14 connecting these windows or windows not shown in the drawing of FIG. 3, are managed according to a priority protocol contained in the memory of the management processor of the console 6. This priority protocol can comprise sequences for modification of the speed of propagation of the simulated order on the arrangement of electroluminescent diodes. It can also contain one or more sequences of simulation of breakdown consisting for example in the inhibition of illumination of the window considered, for example the window 12, by simple complementation of the conditional order for illumination of this window delivered by the circuit 125 at the management processor of the console 6. For this, the mentioned processor delivers and imposes a complemented conditional order to the AND gate 35. A return to zero designated RAZ on FIG. 4b permits the extinction of the arrangement of electroluminescent diodes 14. This type of electronic control thus permits successive illumination of the diodes 14 and the maintenance of them illuminated as desired. The illumination can be controlled at various speeds from complete stopping to instantaneous illumination in passing through any of the different stages of the speed of illumination at the will of the instructor operator. The progression of step by step illumination can also be frozen at any point of the circuit chain by the arrangement of diodes. The assembly of panels intended to represent the different circuits of the installation or of the aircraft can thus be controlled in synchronism due to the electronic control, the student operator being thus able to immediately visualise the effect of an action on an active element in any of the circuits.

Figure 4C:
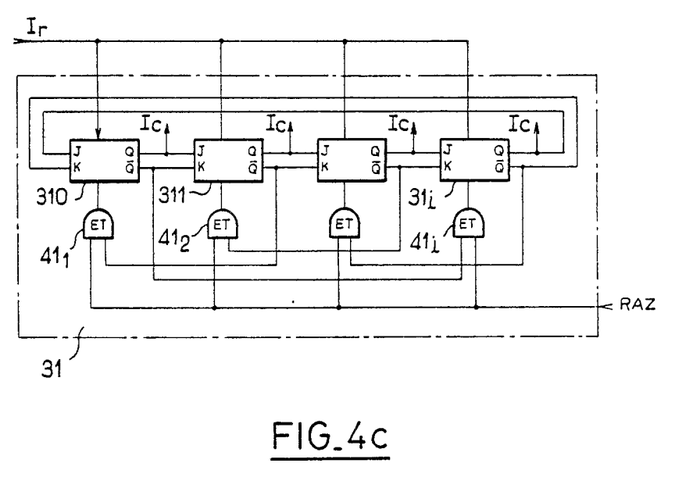

A particularly advantageous embodiment will now be described by means of FIG. 4c. According to this embodiment, the electronic control means and principally the shift register 31 comprise control means $41_1$ to $41_i$ for extinction of the or the group of diodes from the illumination control of the or the group of adjacent diodes. In FIG. 4c, the mentioned control means are constituted by an AND gate of which the input is connected to the return to zero line RAZ and of which the other input is connected to the output $\bar{Q}$ of the bi-stable trigger circuit for control of immediately adjacent lighting, the output of each AND gate $41_1$ to $41_i$ being connected to the input of the return to zero of each bi-stable trigger circuit. The shift register 31, as shown in FIG. 4c, permits the step by step lighting of diodes 14 of an arrangement and the immediate extinction of the immediately prior adjacent group of two diodes. A variation of the frequency of recurrence of the reference pulses Ir delivered by the clock at the will of the instructor operator thus permits ensuring the simulation of the propagation of the order given by the student operator 3 by means of the lighting of a single diode or of a group of electroluminescent diodes 14. The speed of propagation of this order gives as well as the movement an idea of flow, particularly in the case of the simulation of hydraulic circuits or even the control of gas of the aircraft. In this latter case, the frequency of recurrence of the clock, the frequency of the pulses Ir can be modified by an order from the student operator 3, the priority between the orders given by the student operator 3 and the instructor operator being surely defined according to the priority protocol defined in the program contained in the management computer. By way of example, the more the throttles in the cockpit 1 are advanced by the student operator, the more rapid is the speed of the order shown by the lighting of a group of electroluminescent diodes denominated below hereafter called "hare", thus showing and simulating a corresponding flow of gas. The "hare" type visualisation is also synchronous on several panels when an idea of flow occurs for the same reason. By way of non-limitative example, the increase of the speed of the engine by increase of the flow of fuel visualised on the fuel feed circuit, implies also an increase of the flow of pressurised air visualised and simulated on the pneumatic generation circuit.

By way of non-limitative example, the adjustable clock 30 can be controlled by the management processor, by means of a digital to analogue converter type circuit, itself directly connected by an interface to the computer or processor of the operating console 6. In this case, although this embodiment is not shown in the drawings, the adjustable resistance 303 can for example be replaced by a varistor directly controlled by the digital to analogue converter.

Figure 5:
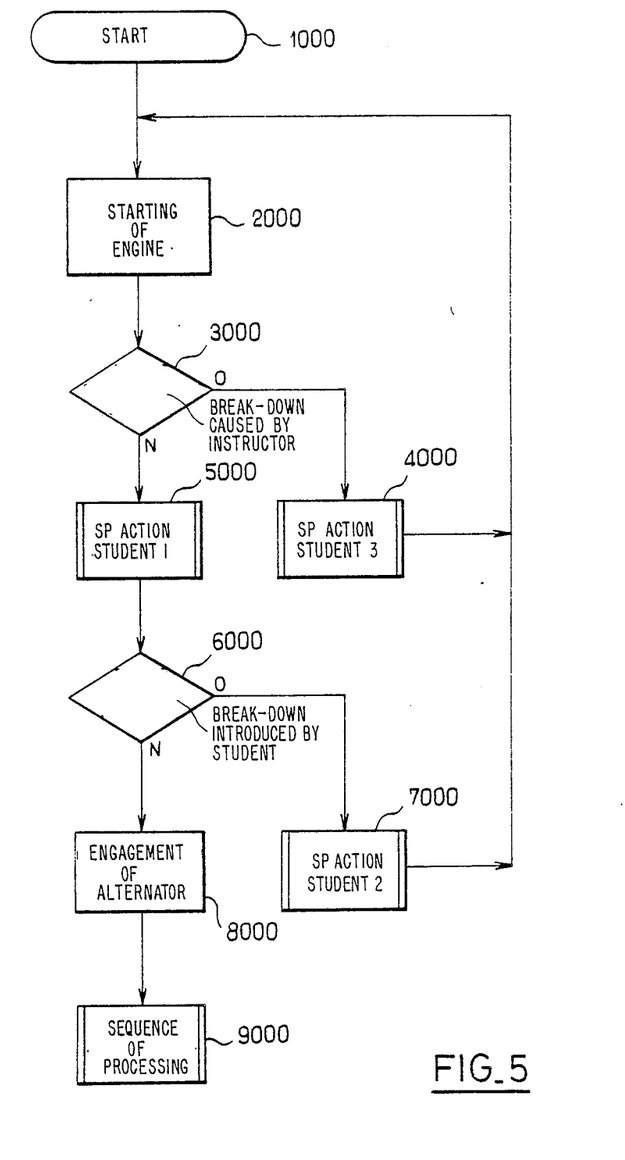
FIG. 5 shows a particular embodiment of a protocol of priority for instructor operator, student operator orders in the case of the simulation of a jet engine failure.

A particular example of the priority protocol between the different orders coming from the instructor operator and from the student operator will now be given in a non-limitative manner in the case of the simulation of a failure of the engine in accordance with FIG. 5. After the start phase 1000 and the starting of the engine 2000, a breakdown can be simulated or not at 3000 by an order coming from the instructor operator. In the case of non-simulation of breakdown, N, a specific action 5000, designated SP Action student 1, can consist of the opening of the valve for admission of air into the compressor of the engine, the verification of the functioning of the compressor, or the opening of the feed of fuel.

In the case of simulation of breakdown, O, a specific action 4000 designated SP action student 3 can consist further of the mentioned specific actions with respect to the control of stopping of the engines and of triggering of the engine safety circuits. The specific action 4000 permits a return to the previous situation at the phase 2000 of starting of the engines. In the absence of the simulation of breakdown, a new test 6000 can be introduced on the actions effected previously by the student operator at 5000.

In the case of a wrong selection by the latter of the position of the fuel valve, this appears as a breakdown or fault introduced by the student operator, O. In this case, a new specific action 7000 designated SP Action student 2 permits a control for return to the previous situation at the phase 2000 of starting by the student operator.

In the absence of fault at 6000 N, the student operator can then at 8000, after verification of the parameters of operating frequency and operating voltage of the alternator operated by the onboard indicators, proceed with the engagement of the alternator of the aircraft on the internal network, the sequence of processing being represented by 9000.

I claim:

1. An analogue simulator for control circuits actuated from an operating station or cockpit (1), particularly for control of an aircraft, comprising:

an exact reproduction of the control cockpit (1) provided with all its controls (2) capable of ensuring the actuation of circuit simulation devices of said circuits by a student operator (3), simulation devices (4) having at least one instruction panel ($5_1, 5_2$), each showing at least one control circuit and intended to display different parameters or simulation motifs visible by the student operator (3), an operating console (6) ensuring the connection (7,8) between the simulation devices (4) and the cockpit (1) and able to permit a modification by an instructor operator of the parameters of simulation of the simulation devices according to a priority procedure between the orders coming from the operating console and the orders coming from the controls of the cockpit, wherein the simulation devices each comprise at least one panel for an electric circuit, a plurality of hydraulic or fluid circuits, and a plurality of service circuits such as the air conditioning, pressurization and heating, and means for electronic control of the display of these panels and wherein each panel ($5_1, 5_2$) comprises a support body (10) of a plexiglas sheet (11), said plexiglas sheet having motifs representative of the outlines of the circuits and/or of apparatus constituting these circuits, the active elements of these circuits, being shown by windows (12,13) of colour which are illuminated on simulated bringing to service of the active elements.

2. An analogue simulator for control circuits according to claim 1, characterised in that in the exact reproduction (2) of the cockpit, each control controls the lighting or extinction of corresponding simulation devices (4).

3. An analogue simulator for control circuits according to claim 1 or claim 6, characterised in that the operating console (6) in order to permit a modification of the parameters of simulation of the simulation devices (4) according to a priority procedure between the orders coming from the operating console (6) and the orders coming from all the controls of the cockpit (1) is managed by a micro-processor provided with its peripherals and driven by an interactive program of the menu type able to permit an instructor operator to define the said priorities in view of a programmed selective variation of the simulation parameters presented to the student operator.

4. An analogue simulator for control circuits according to claim 1, characterised in that the colours of the coloured windows are of simple colours or combinations of colours (120,121) coded in a manner to define the nature of the active elements, the said windows further comprising legends (122) relating to the characteristics of the said active elements.

5. An analogue simulator for control circuits according to claims 6 or 7 characterised in that the said circuits are represented on the panels by arrangement (14) of electroluminescent diodes arranged edge to edge, the lighting of the said diodes being, in operation, controlled either in a permanent manner, or in a periodic manner.

6. An analogue simulator for control circuits actuated from an operating station or cockpit (1), particularly for control of an aircraft, comprising:

an exact reproduction of the control cockpit (1) provided with all its controls (2) capable of ensuring the actuation of circuit simulation devices of said circuits by a student operator (3), simulation devices (4) having at least one instruction panel ($5_1, 5_2$), each showing at least one control circuit and intended to display different parameters or simulation motifs visible by the student operator (3), an operating console (6) ensuring the connection (7,8) between the simulation devices (4) and the cockpit (1) and able to permit a modification by an instructor operator of the parameters of simulation of the simulation devices according to a priority procedure between the orders coming from the operating console and the orders coming from the controls of the cockpit, wherein the simulation devices each comprise at least one panel ($5_1$) for the electric circuit, at least one panel ($5_2$) for a plurality of hydraulic or fluid circuits, at least one panel for a plurality of service circuits such as the air conditioning, pressurization and heating, and means for electronic control of the display of these panels and wherein the electronic control means comprise:

a clock (30) with an adjustable frequency able to deliver reference pulses (Ir) of a frequency in a determined range of frequency, a system of the shift register type (31) for receiving the reference pulses (Ir) delivered by the clock, each stage of shifted output delivering shifted control pulses to a system for controlling lighting ($32_i$) of at least one electroluminescent diode.

7. An analogue simulator for control circuits actuated from an operating station or cockpit (1), particularly for control of an aircraft, comprising:

an exact reproduction of the control cockpit (1) provided with all its controls (2) capable of ensuring the actuation of circuit simulation devices of the said circuits by a student operator (3), simulation devices (4) having at least one instruction panel ($5_1, 5_2$), each showing at least one control circuit and intended to display different parameters or simulation motifs visible by the student operator (3), an operating console (6) ensuring the connection (7,8) between the simulation devices (4) and the cockpit (1) and able to permit a modification by an instructor operator of the parameters of simulation of the simulation devices according to a priority procedure between the orders coming from the operating console and the orders coming from the controls of the cockpit, wherein the simulation devices each comprise at least one panel ($5_1$) for an electric circuit, at least one panel ($5_2$) for a plurality of hydraulic or fluid circuits, at least one panel for a plurality of service circuits such as the air conditioning, pressurization and heating, and means for electronic control of the display of these panels and wherein the electronic control means comprise:

a clock (30) with an adjustable frequency able to deliver reference pulses (Ir) of a frequency in a determined range of frequency, a system of the shift register type (31) for receiving the reference pulses (Ir) delivered by the clock, each stage of shifted output delivering shifted control pulses to a system for controlling lighting (32$_i$) of at least one electroluminescent diode for a periodic control of lighting, the electronic control means further comprising control means (41$_1$ to 41$_i$) for extinction of the group of diodes from the lighting control or the adjacent group of diodes.

* * * * *

UNITED STATES PATENT AND TRADEMARK OFFICE
CERTIFICATE OF CORRECTION

PATENT NO. : 4,842,520
DATED : 6/27/89
INVENTOR(S) : Dupont

It is certified that error in the above-identified patent and that said Letters Patent is hereby corrected as shown below:

col. 01, line 11    after "training"    insert --pilots, flight engineers or ground crew undergoing training--

Signed and Sealed this

Twelfth Day of March, 1991

Attest:

HARRY F. MANBECK, JR.

Attesting Officer

Commissioner of Patents and Trademarks